United States Patent Office 3,248,432
Patented Apr. 26, 1966

3,248,432
PROCESS FOR THE PRODUCTION OF ETHYL ALCOHOL
Ambert D. Riley, Sterlington, and Wilton O. Bell, Monroe, La., assignors to Commercial Solvents Corporation, New York, N.Y., a corporation of Maryland
No Drawing. Filed Dec. 12, 1961, Ser. No. 158,870
10 Claims. (Cl. 260—638)

Our invention relates to a process for the production of ethyl alcohol. More particularly our invention relates to an improved process for the production of ethyl alcohol by the interaction of methanol, carbon monoxide, and hydrogen.

Ethyl alcohol is a substance which has long been used by man. It has been produced for centuries by the fermentation of the common grains. Within recent years, however, synthetic processes have been developed to produce this alcohol for industrial use. Such processes not only permit the use of more economical materials than those used in the fermentation procedures but permit production of a more standardized product in more easily predictable yields. It has been proposed that methanol is a logical inexpensive source for ethyl alcohol since methanol can be economically produced in great quantities from carbon monoxide and hydrogen. In fact it has long been known that the methanol formation reaction can be carried further to produce ethyl alcohol by subsequently reacting the already produced methanol with carbon monoxide and hydrogen in the presence of a water-soluble cobalt catalyst and an iodine promoter at high temperatures and pressures. However, even though this reaction is theoretically sound and has been successfully attempted, the yields of ethyl alcohol have generally been low due in part to the large amounts of other materials such as aldehydes, esters, acids, and even gases such as methane which are concurrently produced.

We have now discovered an improved process whereby ethyl alcohol can be produced in greater yields than were previously attainable by the interaction of methanol, carbon monoxide, and hydrogen in the presence of a water-soluble cobalt catalyst and an iodine promoter.

Generally our process consists of conducting the reaction of methanol, carbon monoxide, and hydrogen in the presence of a water-soluble cobalt catalyst and iodine promoter and, in addition, ethyl alcohol promoting amounts of a phosphorus compound soluble in methanol at the temperatures of reaction.

Generally temperatures ranging from about 150–250° C. can be satisfactorily employed in our process. However, it is preferable to utilize temperatures ranging from about 175–230° C.

Pressures which can be successfully employed in our process should generally be in excess of 3,000–4,000 p.s.i. but should not exceed 14,000–15,000 p.s.i. because of the tendency to form glycol ethers at higher pressures.

Any suitable phosphorus compound soluble in methanol at reaction temperatures can be utilized in our process. Such phosphorus compounds include the phosphonates such as bis(2-ethylhexyl)-2-ethylhexylphosphonate, the phosphites such as dibutylhydrogen phosphite, and tris(2-ethylhexyl)phosphite, the phosphines such as triphenyl phosphine, the phosphates such as monoammonium phosphate, sodium meta phosphate, disodium hydrogen phosphate, dipotassium hydrogen phosphate, and diammonium phosphate, phosphoric acid, etc., and the like.

Any soluble source of cobalt can be utilized as the catalyst of our invention. Examples of suitable cobalt sources are the cobalt carbonyls, the lower salts of alkanoate cobalt such as cobalt acetate, cobalt formate, cobalt propionate, etc., and the like.

Generally speaking, ratios of methanol to phosphorus compound from which satisfactory results can be obtained in our process are from about 1.0 to about 0.01 gram of phosphorus compound for each gram mole of methanol. It is preferable however to utilize from about 0.3 to about 0.03 gram of phosphorus compound for each gram mole of methanol.

Also, satisfactory results can be obtained from our process by using ratios of cobalt metal to methanol of from about 0.5 to about 0.05 gram of cobalt metal for each gram mole of methanol. A ratio of 1 gram mole of methanol to about 0.3–0.2 gram of cobalt metal is preferred.

The ratio of methanol to iodine promoter which can be satisfactorily utilized in our process generally ranges from about 0.4 to about 0.005 gram of iodine promoter for each gram mole of methanol. We prefer to utilize from about 0.3 to about 0.1 gram of iodine promoter for each gram mole of methanol.

Ratios of hydrogen to carbon monoxide of from about 4 moles to 1 mole of hydrogen to about 1 mole to 2 moles of carbon monoxide have been found to be satisfactory when utilized in our process.

The period of time necessary to satisfactorily complete our process is generally from about one to about three hours. For when reaction times greater than three hours are utilized, unwanted by-products are built up while when less than one hour is utilized, sufficient ethyl alcohol is not obtained.

The following examples serve to illustrate our process. It is not intended however that our invention should be limited to the exact procedures, specific apparatus, or specified materials set forth therein; for we intend to include all equivalents obvious to the art.

*Example I*

Into a 1,800 ml. stainless steel rocking bomb reactor equipped for pressurized reactions were charged 480 grams methanol, 10 grams cobalt acetate, and 2.0 grams of iodine. Air was expelled from the reactor and the reactor was pressurized to about 4,000 p.s.i. with hydrogen and carbon monoxide utilizing equimolar amounts of hydrogen and carbon monoxide. The temperature of the pressurized reaction mixture was quickly raised to 190–210° C. with a concurrent rise in pressure to about 5,800 p.s.i. Pressure and temperature were maintained at about these levels for a period of two hours. At the end of the two-hour period, the reaction mixture was immediately cooled to about 0° C. The reaction mixture was found to contain 170.2 grams of ethyl alcohol.

*Example II*

Into a 1,800 ml. stainless steel rocking bomb reactor equipped for pressurized reactions were charged 480 grams methanol, 10 grams cobalt acetate, 2.0 grams iodine, and 0.5 gram diammonium phosphate. Air was expelled from the reactor and the reactor was pressurized to about 4,000 p.s.i. with hydrogen and carbon monoxide utilizing equimolar amounts of hydrogen and carbon monoxide. The temperature of the pressurized reaction mixture was quickly raised to 190–210° C. with a concurrent rise in pressure to about 5,800 p.s.i. The pressure and temperature were maintained at these levels for a period of about two hours. At the end of the two-hour period, the reaction mixture was immediately cooled to about 0° C. The reaction mixture was found to contain 212.1 grams of ethyl alcohol thus demonstrating the effectiveness of diammonium phosphate in improving the yield of ethyl alcohol.

*Example III*

The procedure of Example II was carried out with the exception that 0.5 gram of monoammonium phosphate was utilized instead of diammonium phosphate. Results similar to those of Example II were obtained.

*Example IV*

The procedure of Example II was carried out with the exception that 2 grams of bis(2-ethylhexyl)-2-ethylhexylphosphonate was utilized instead of diammonium phosphate. Results similar to those of Example II were obtained.

*Example V*

The procedure of Example II was carried out with the exception that 0.7 gram of phosphoric acid was utilized instead of diammonium phosphate. Results similar to those of Example II were obtained.

*Example VI*

The procedure of Example II was carried out with the exception that 2 grams of tris(2-ethylhexyl)phosphite were utilized instead of diammonium phosphate. Results similar to those of Example II were obtained.

*Example VII*

The procedure of Example II was carried out with the exception that 2 grams of triphenyl phosphine were utilized instead of diammonium phosphate. Results similar to those of Example II were obtained.

Now having described our invention, what we claim is:

1. In a process for the production of ethyl alcohol by the reaction of methanol, carbon monoxide and hydrogen under pressures in excess of about 3,000–4,000 p.s.i. but not in excess of pressures at which glycol ethers are formed and temperatures ranging from about 150 to about 250° C. in the presence of a cobalt catalyst containing from about 0.5 to about 0.05 gram of cobalt metal for each gram mole of methanol, and from about 0.4 to about 0.005 gram of iodine promoter for each gram of methanol and utilizing a mole ratio of hydrogen to carbon monoxide of from about 4 to 1 to about 1 to 2, the improvement which comprises carrying out the reaction in the presence of ethyl alcohol promoting amounts of a phosphorus compound selected from the group consisting of diammonium phosphate, monoammonium phosphate, phosphoric acid, tris(2-ethylhexyl) phosphite, dibutylhydrogen phosphite, triphenyl phosphine, bis(2-ethylhexyl)-2-ethylhexyl phosphonate, sodium meta phosphate, disodium hydrogen phosphate and dipotassium hydrogen phosphate.

2. The process of claim 1 wherein the ratio of phosphorus compound to methanol is from about 1.0 to about 0.01 gram of phosphorus compound for each gram mole of methanol.

3. The process of claim 1 wherein the phosphorus compound is diammonium phosphate.

4. The process of claim 1 wherein the phosphorus compound is monoammonium phosphate.

5. The process of claim 1 wherein the phosphorus compound is phosphoric acid.

6. The process of claim 1 wherein the phosphorus compound is tris(2-ethylhexyl)phosphite.

7. The process of claim 1 wherein the phosphorus compound is triphenyl phosphine.

8. The process of claim 1 wherein the phosphorus compound is bis(2-ethylhexyl)-2-ethylhexylphosphonate.

9. The process of claim 1 wherein the ratio of phosphorus compound to methanol is from about 0.3 to about 0.03 gram of phosphorus compound for each gram mole of methanol.

10. The process of claim 1 wherein the cobalt catalyst contains from about 0.3 to 0.2 gram of cobalt metal for each gram mole of methanol and about 0.3 to about 0.1 gram of iodine promoter is used for each gram mole of methanol.

References Cited by the Examiner
UNITED STATES PATENTS

| | | | |
|---|---|---|---|
| 2,623,906 | 12/1952 | Gresham | 260—642 |
| 2,713,073 | 7/1955 | Smith | 260—638 X |
| 2,762,847 | 9/1956 | Miller et al. | 260—638 X |

FOREIGN PATENTS 877,598   5/1953   Germany.

OTHER REFERENCES

Ephraim, Inorganic Chemistry, 4th Ed., Interscience Publishers, Inc., 1947, pages 27, 44, 705–708, 711.

Wender et al., Science, vol. 113, Feb. 23, 1951, pp. 206–207.

LEON ZITVER, *Primary Examiner.*